April 22, 1958     J. C. KILLEBREW     2,831,288

FISHING LINE ATTACHMENT

Filed March 29, 1957

INVENTOR
John C. Killebrew
BY
John C. Killebrew 2,831,288
Patented Apr. 22, 1958

2,831,288

FISHING LINE ATTACHMENT

John C. Killebrew, Madison, Wis.

Application March 29, 1957, Serial No. 649,472

1 Claim. (Cl. 43—43.11)

This invention relates generally to a fishing line attachment and in particular to a retrievable casting sinker or casting float.

The main object of the invention is to provide an improved fishing line attachment which can be attached to a fishing line intermediate the length of the latter without the necessity of passing an end of the line through any part of the fishing line attachment and which can be firmly attached without the use of knots, grippers, or clinching devices; which can be easily attached and detached when desired; and which is simple and durable in construction, economical to manufacture, positive and effective in use, and neat and attractive in appearance, with all parts of like material.

Another object is to so construct the fishing line attachment that its effectiveness as a casting weight or casting float will not be lessened and its tendency to become snagged will be greatly lessened.

A further object is to provide a fishing line attachment which when made of nonbuoyant materials will sink and when made of buoyant materials will float; which in both instances will lend weight for the purpose of casting and will be fastened to the line in the same manner.

Another object is to construct a fishing line attachment that can be attached and used with a minimum of damage to the line; especially when used on monofilament type of lines which can become weakened at any point of extreme distortion caused by grippers, clinching, or knots.

These objects I accomplish by means of such structure and relative arrangement of parts as will fully appear by a perusal of following specifications and claim and illustrated in the drawing herewith:

Figure 1:
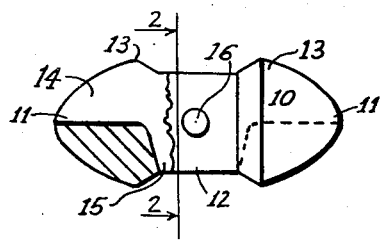
Figure 1 is a side elevation of the device showing a portion of one end broken away in longitudinal section.
Figure 2:
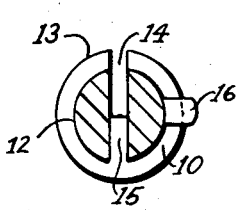
Figure 2 is a transverse section taken along the line 2—2 in Figure 1.
Figure 3:
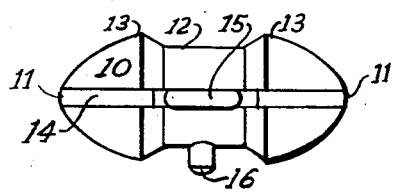
Figure 3 is the top plan view of the fishing line attachment.
Figure 5:
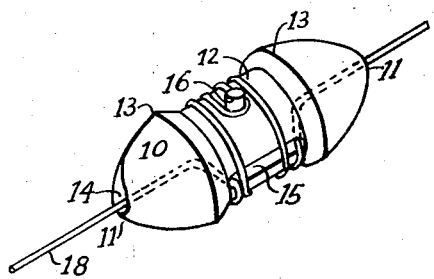
Figure 5 is a perspective view of the device as attached to a line or leader.
Figure 4:
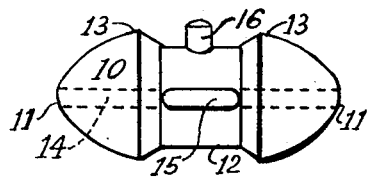
Figure 4 is a bottom plan view of the fishing line attachment.

Referring now more particularly to the characters of reference on the drawing, the improved fishing line attachment comprises an elongated body 10 of buoyant or nonbuoyant material, such as wood or lead which is somewhat cylindrical in shape and symmetrically tapered at ends 11. The midsection 12 of body 10 between portions 13 of ends 11 is somewhat smaller in diameter than the maximum diameter of ends 11. The body 10 is formed with a lengthwise groove 14 extending the full length along the center of body 10 and which in turn intersects an elongated slot 15 which is orientated in the same lengthwise direction but on opposite side of body 10 and extends between portions 13 of ends 11 through midsection 12. Slot 15 is somewhat tapered from the outer surface of body 10 to the point it intersects with groove 14. Located on one side of body 10 is a cylindrically shaped projection 16 located midway on said body 10 at right angles to the lengthwise plane surfaces formed by groove 14 and slot 15.

This provides a form which will permit the fastening of the device to the line; so that, when retrieved, the device will tend to assume a predetermined position in the water. This position is maintained by a portion of the line riding in groove 14.

This also provides a form which can be produced in one piece of a single material such as wood, lead or other metal, plastic, or glass, all of which may be poured, cast, molded, extruded in one operation to produce a monolithic structure. The use of a single material eliminates electrochemical reaction between dissimilar materials and thus permits its use in fresh or saline waters. The use of one material provides uniform density to the device so as to impart more stability in both casting and retrieving.

In attaching the device to a line, the line is grasped at a predetermined point intermediate the length thereof and a loop is formed and threaded through the groove 14 and through the elongated slot 15. The threaded loop is then wrapped around the midsection 12 of the device one or more times and the remaining loop is then engaged over the cylindrical projection 16. Tension is then applied to the line which will remove slack so that it cannot unwrap from the body 10. The fishing line attachment can thus be quickly connected to the line at any desired position along the latter without the necessity of passing an end of the line through the device and without the use of knots or clinchers. The device can also be quickly detached from the line by simply disengaging the line from the cylindrical projection 16 and unwrapping the looped portion of the line.

Figure 7:
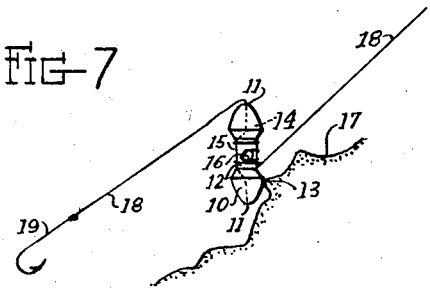
Figure 7 is a view similar to Figure 6 showing the fishing line attachment being freed from the obstruction.
Figure 6:
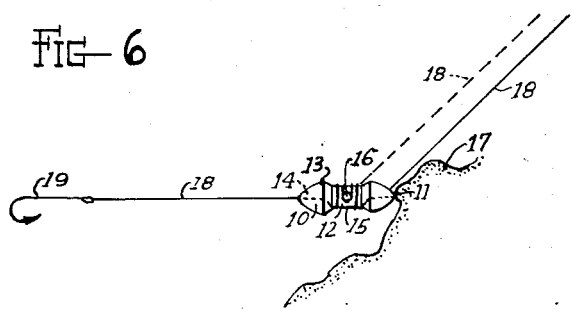
Figure 6 is a view showing the device snagged on an obstruction.

It can be seen in Figures 6 and 7 that when an end 11 engaged an obstruction 17, the line 18, when pulled, will shift near the midpoint of the device (shown in Figure 6 by the dotted line) and cause the device to up-end as illustrated in Figure 7.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

What is claimed is:

A fishing line attachment comprising an elongated somewhat cylindrical body symmetrirally tapered at the ends and said body having a smaller cross section in its intermediate midportion than the maximum diameter of said ends, said body having a radial groove therein opening to the exterior of said body at a depth of one half of said body and extending from end to end thereof and said groove in communication with an elongated slot orientated in the same lengthwise direction forming an opening through the midsection of said body, and a cylindrically shaped projection protruding laterally from said body intermediate the length of the latter and at right angles to the plane of the lengthwise common walls of said groove and said slot to hold a loop portion of a fishing line threaded through the said groove, through the said slot, and wrapped around the intermediate midportion of said body.

References Cited in the file of this patent

UNITED STATES PATENTS

| | | |
|---|---|---|
| 1,883,574 | Cleeland | Oct. 18, 1932 |
| 2,315,048 | Croft | Mar. 30, 1943 |